United States Patent [19]

Fujita

[11] Patent Number: 4,987,966

[45] Date of Patent: Jan. 29, 1991

[54] SLIPPAGE PREVENTING APPARATUS FOR A VEHICLE

[75] Inventor: Nagahisa Fujita, Hiroshima, Japan

[73] Assignee: Mazda Motor Corporation, Hiroshima, Japan

[21] Appl. No.: 222,628

[22] Filed: Jul. 21, 1988

[30] Foreign Application Priority Data

Jul. 21, 1987 [JP] Japan ................................ 62-182823

[51] Int. Cl.$^5$ .................. B60K 31/000; F02D 29/000
[52] U.S. Cl. .................................... 180/197; 180/170; 303/100; 361/238; 364/426.01; 364/426.02; 364/426.03; 364/426.04
[58] Field of Search ................ 180/197, 170; 303/100, 303/110; 361/238; 364/426.01, 426.02, 426.03, 426.04

[56] References Cited

U.S. PATENT DOCUMENTS

| | | | |
|---|---|---|---|
| 4,725,969 | 2/1988 | Onogi et al. | 364/426.04 |
| 4,733,760 | 3/1988 | Inagaki et al. | 180/197 X |
| 4,739,856 | 4/1988 | Inagaki et al. | 180/197 |
| 4,760,893 | 8/1988 | Sigl et al. | 180/197 |
| 4,771,848 | 9/1988 | Namba et al. | 180/197 |
| 4,829,437 | 5/1989 | Suzuki et al. | 180/179 |
| 4,845,622 | 7/1989 | Suzuki et al. | 180/179 |
| 4,854,411 | 8/1989 | Ise et al. | 180/197 |

Primary Examiner—Mitchell J. Hill
Attorney, Agent, or Firm—Fish & Richardson

[57] ABSTRACT

The vehicle is provided with a slippage preventing apparatus and an automatic drive control device. The slippage preventing apparatus is designed to control a degree of slippage of the driven wheel of a vehicle so as not to become too large. The automatic drive control device is adapted to increase or decrease an output of the engine so as to allow a vehicle speed to reach a given value. The slippage preventing apparatus controls operation of the automatic drive control device when a degree of slippage of the driven wheel is controlled by means of the slippage preventing apparatus. Operation of the automatic drive control device is controlled by thoroughly suspending operation of the automatic drive control device or solely suspending its operation so as to increase the output of the engine.

22 Claims, 14 Drawing Sheets

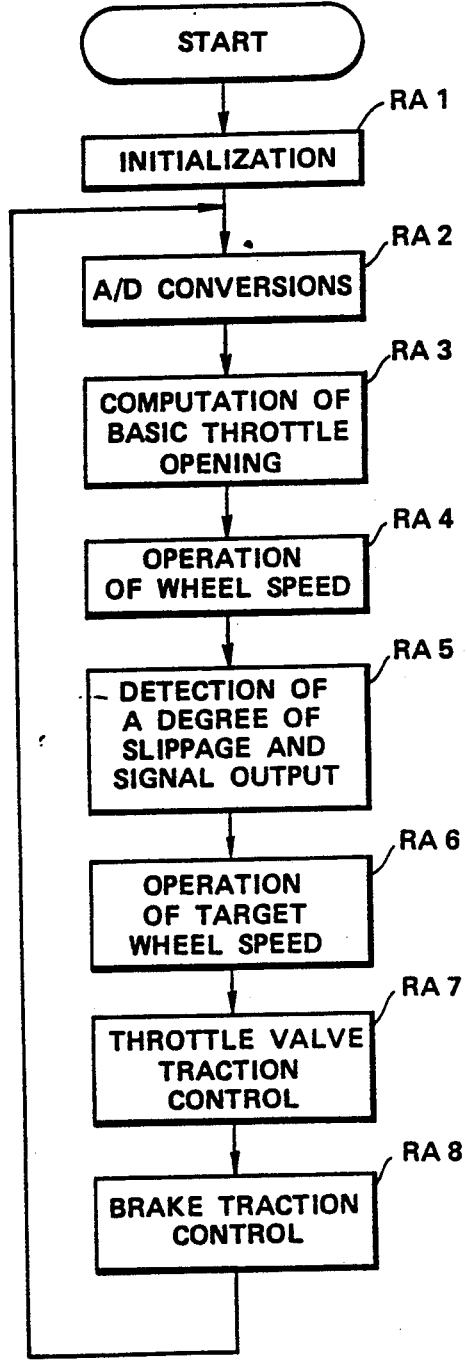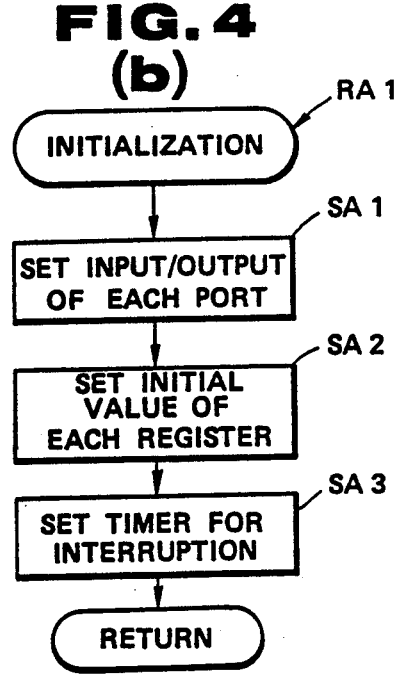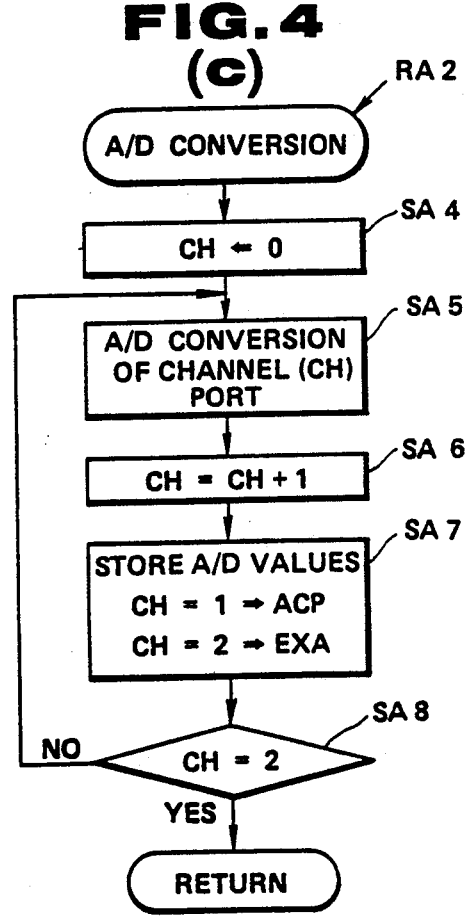

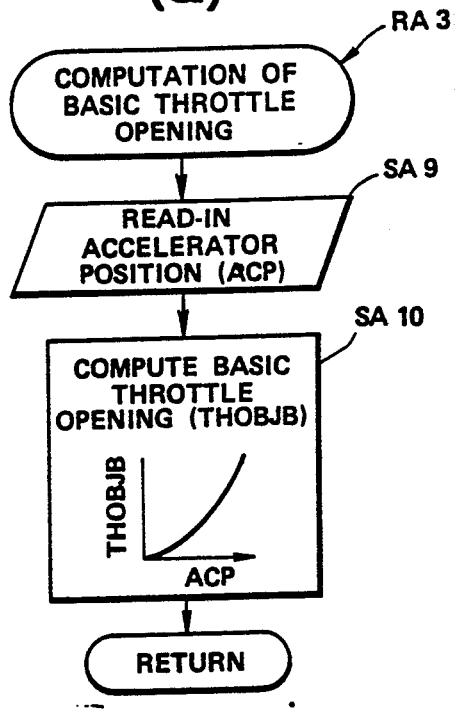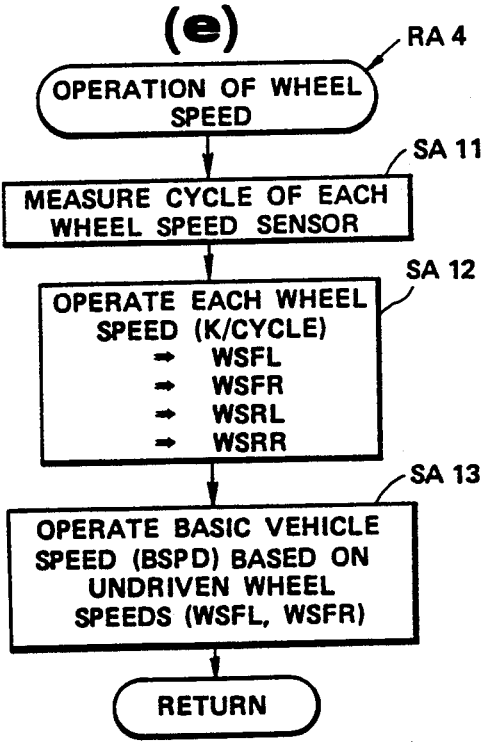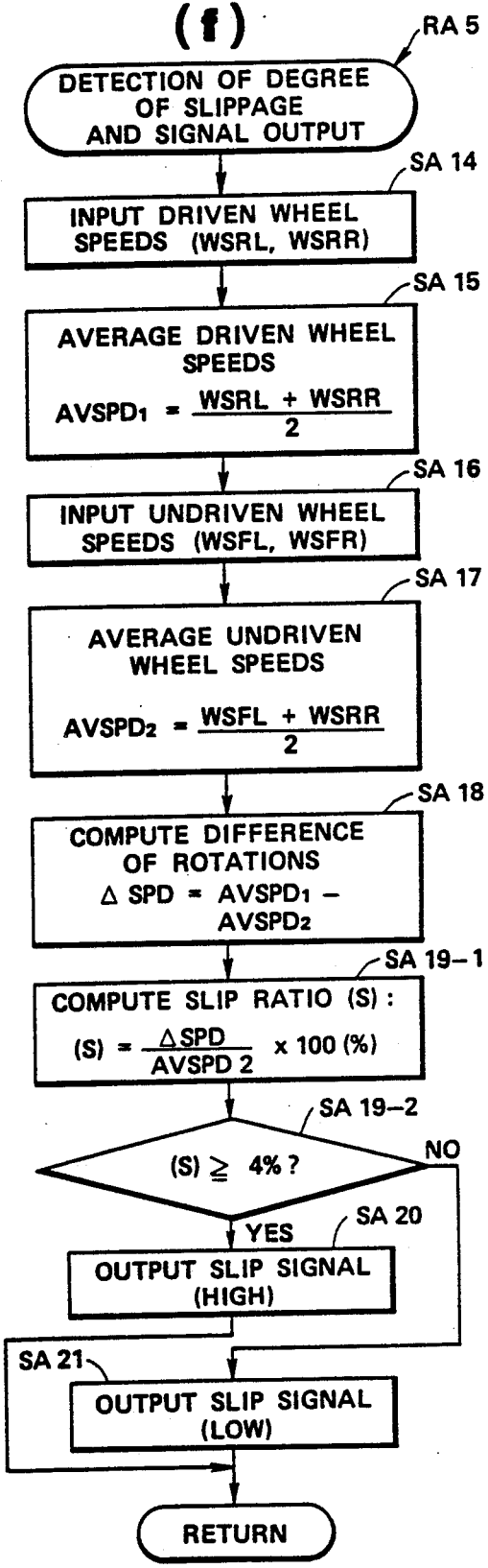

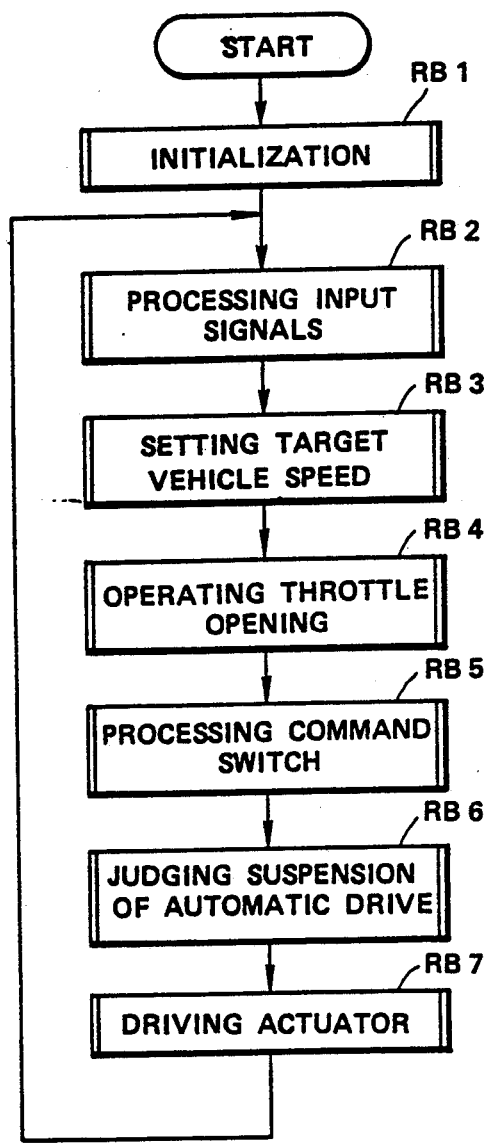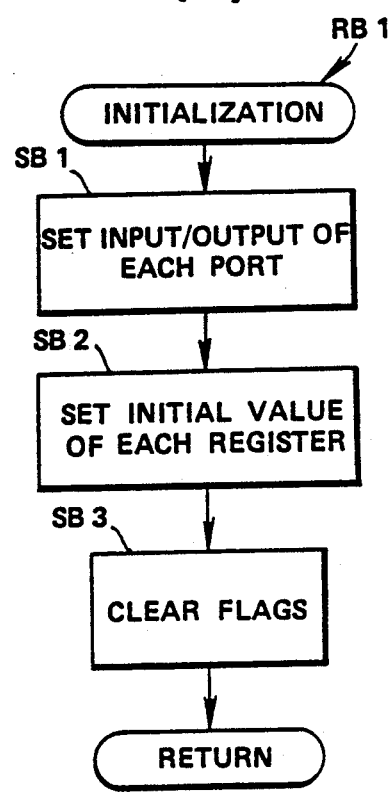

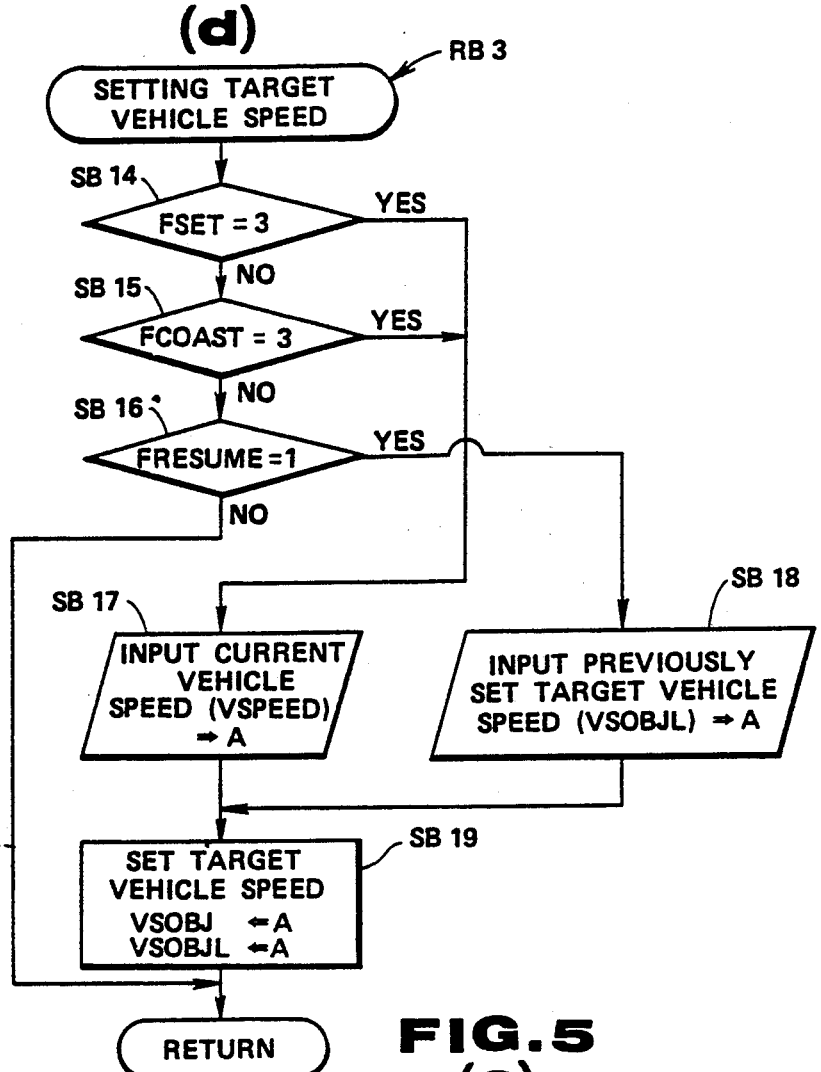
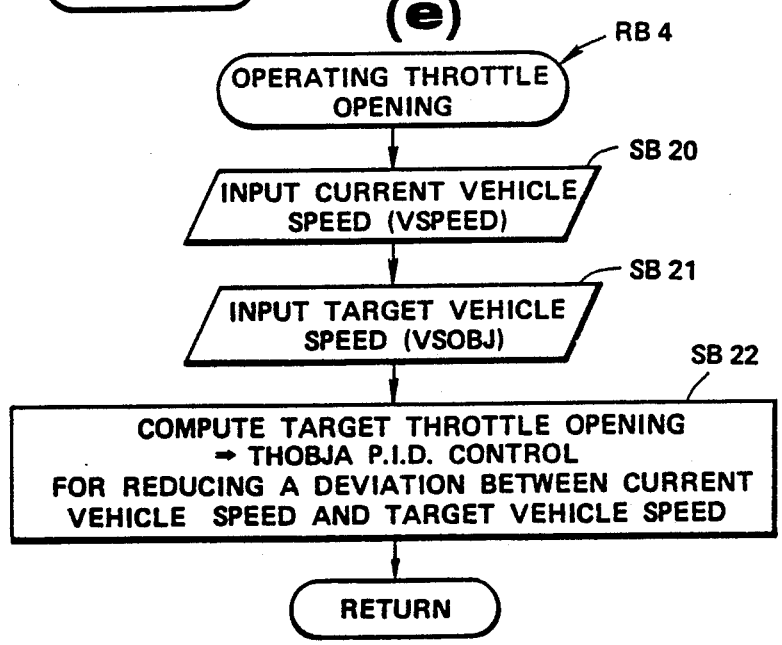

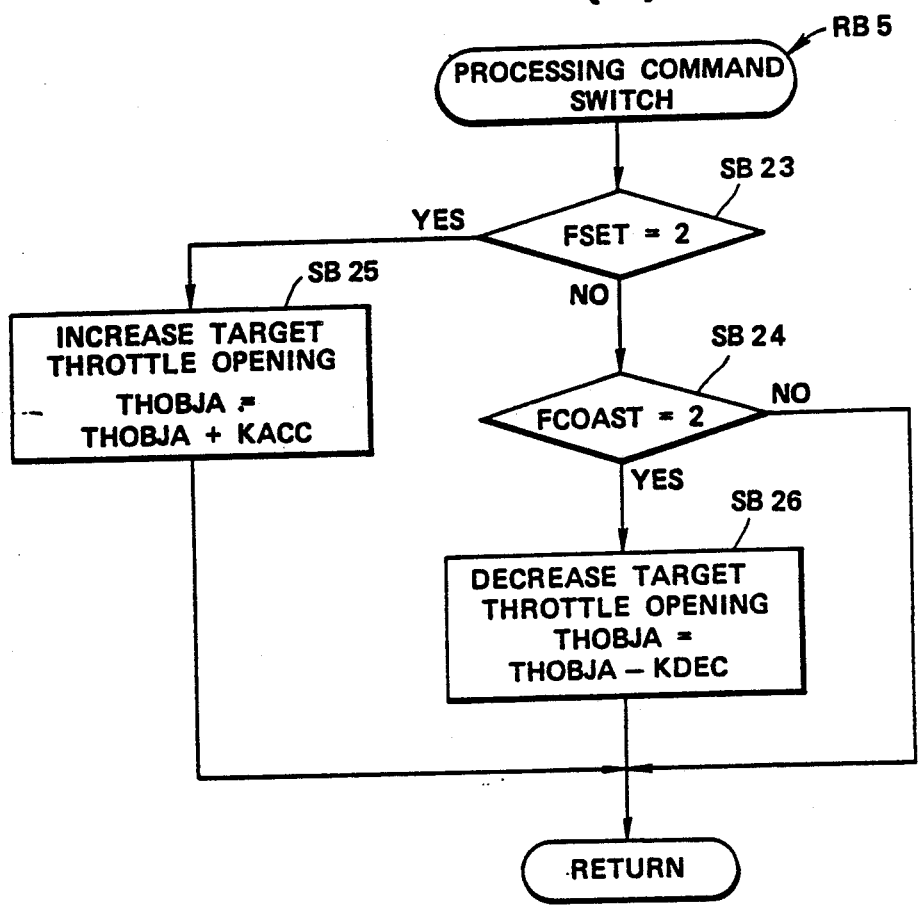

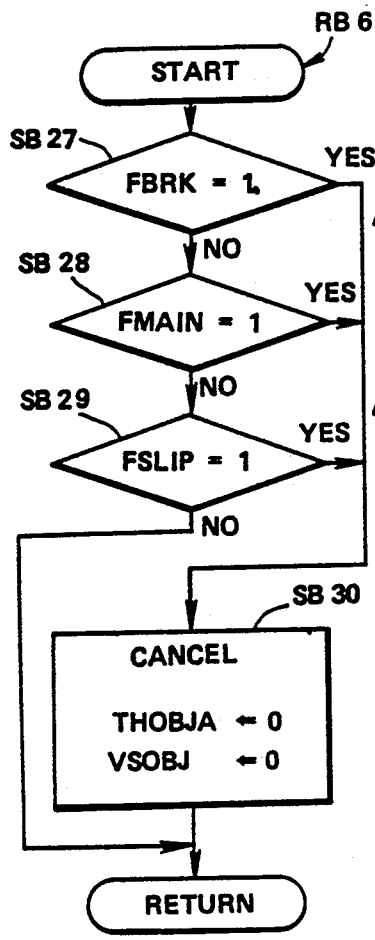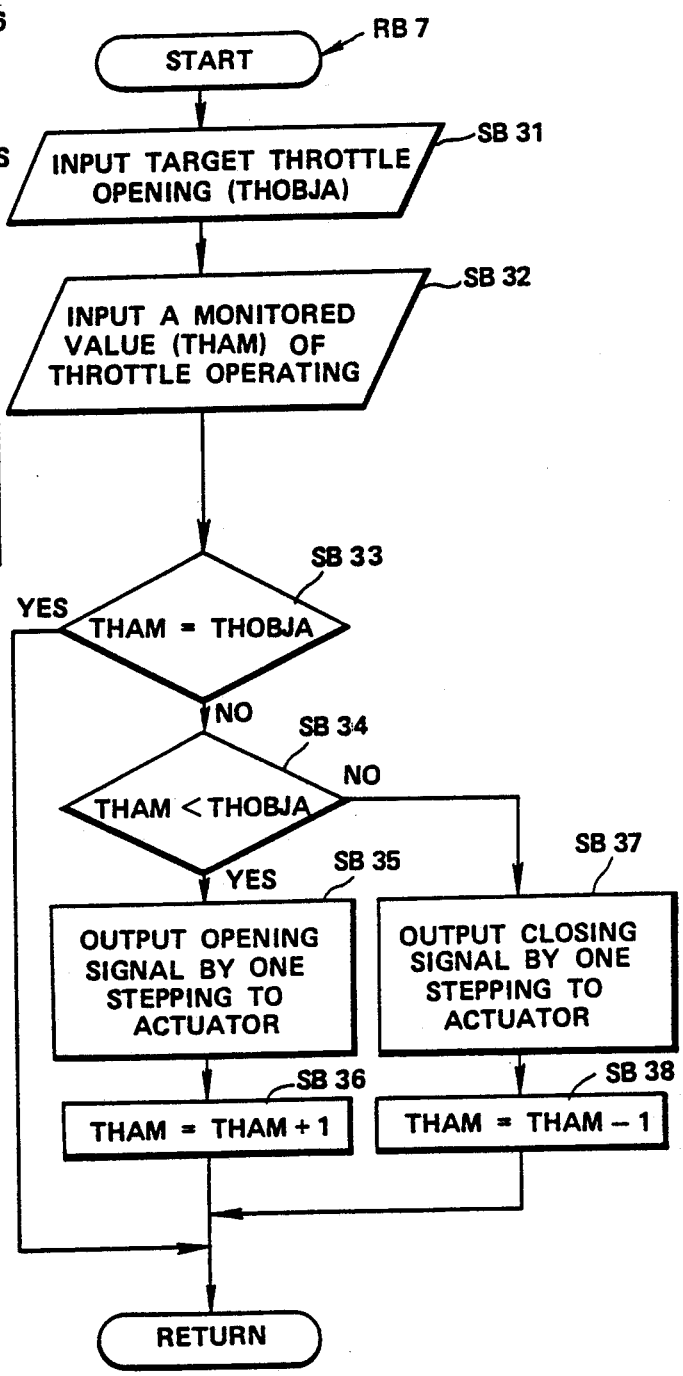
FIG. 5 (g)
FIG. 5 (h)

SLIPPAGE PREVENTING APPARATUS FOR A VEHICLE

BACKGROUND OF THE INVENTION

1. Field of the Invention

The present invention relates to a slippage preventing apparatus for a vehicle and, more particularly, to a slippage preventing apparatus for a vehicle, which is provided with a traction control device and an automatic drive device, the traction control device being adapted to control an output of the engine in accordance with a degree of slippage of the driven wheels thereof.

2. Description of Related Art

Japanese Patent Publication (laid-open) No. 151,158/-1985 discloses a device for preventing the driven wheels from slipping by means of a so-called traction control which is designed to decrease an output of the engine during occurrence of slippage in accordance with a degree of slippage of the driven wheels which is determined on the basis of speeds of the driven wheels and the undriven wheels.

An automatic drive device is also known which is designed to control an output of the engine so as to maintain a given vehicle speed determined by command switches operated by the driven on the basis of signals from a vehicle speed determining section with the command switches.

It is accordingly to be noted that a slippage preventing apparatus for a vehicle may be designed from such a traction control device and an automatic drive device to thereby control the engine output, preventing slippage of the driven wheels. However, it is to be understood that the traction control device and the automatic drive device are adapted to control the engine output in different ways so that a combination of these devices may cause problems when they are operated at the same time. That is, when slippage occurs upon changes in road surface friction factors in a state of the automatic drive control in response to operation of the command switches, both the traction control device and the automatic drive device are brought into a state that they may be operated at the same time. In this case, the slippage should be controlled prior to maintaining the automatic drive, however, the traction control device is designed to reduce the engine output upon occurrence of slippage, thus slowing down a vehicle speed, while the automatic drive device is operated to maintain the driving state by increasing the engine output as the vehicle speed slows down. This difference may cause the traction control device to work inefficiently.

SUMMARY OF THE INVENTION

The present invention has the object to provide a slippage preventing apparatus for a vehicle consisting of the traction control device and the automatic drive device, which can ensure a prevention of slippage of the driven wheels by operation of the former prior to operation of the latter in such a state that the latter is capable of being operable.

In one aspect the present invention consists of the slippage preventing apparatus for a vehicle, which comprises output adjusting means for adjusting an output of an engine by increasing or decreasing the output thereof; slippage detecting means for detecting a degree of slippage on pavement of a driven wheel thereof driven by the engine; first control means for controlling the output adjustment means to reduce the output of the engine during occurrence of slippage in response to an output from the slippage detecting means; second control means for controlling the output adjusting means to cause a vehicle speed to reach a given vehicle speed, the second control means being manually started-up; and restricting means for restricting operation of the second control means at least during operation of the first control means.

In another aspect the present invention consists of the slippage preventing apparatus for a vehicle which comprises output adjusting means for adjusting an output of an engine by increasing or decreasing the output thereof; torque adjusting means for adjusting a torque to be applied to a driven wheel driven by the engine; slippage detecting means for detecting a degree of slippage on pavement of the driven wheel larger than a given value; first control means for controlling the torque adjusting means so as to reduce the torque to be applied to the driven wheel when the degree of slippage is larger than the given value, in response to an output from the slippage detecting means; second control means for controlling the output adjusting means so as to allow a vehicle speed to reach a given vehicle speed, the second control means being manually started-up; and restricting means for restricting an increase in the output of the engine from the second control means when the first control means is operated during operation of the second control means.

These arrangement permit an efficient control over slippage of the vehicle by means of the traction control device even when the driven wheels thereof slip during the automatic drive control by means of the automatic drive device.

DETAILED DESCRIPTION OF THE PREFERRED EMBODIMENTS

Figure 1:
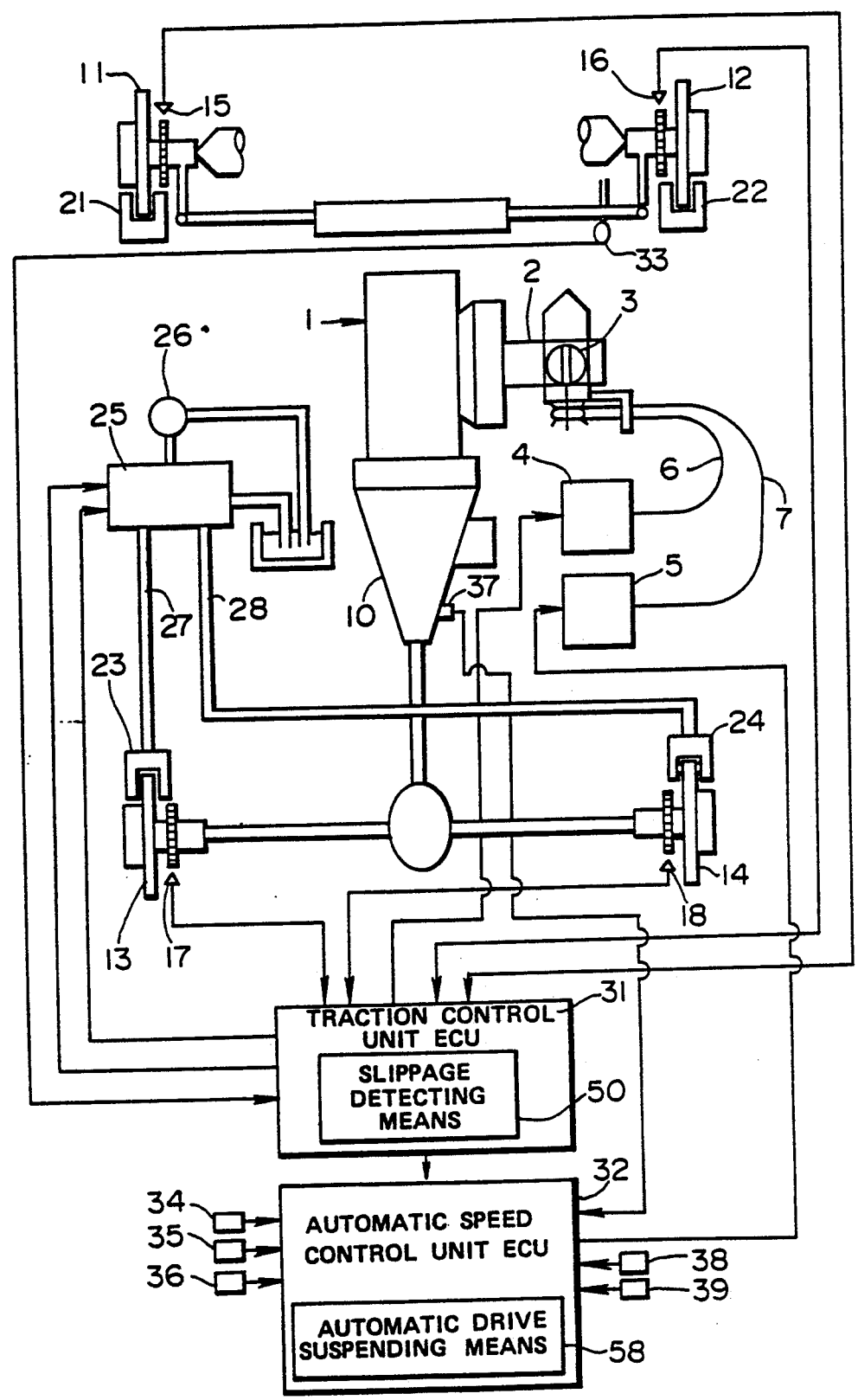
FIG. 1 is a diagrammatic view illustrating an outline of the slippage preventing apparatus embodying one example according to the present invention.

FIG. 1 shows an outline of the slippage preventing apparatus embodying one example according to the present invention. In FIG. 1, an engine 1 has an inlet air passage 2 which is mounted with a throttle valve 3 for adjusting an amount of intake air. The throttle valve 3 is operable by an actuator such as a stepping motor or the like so as to electrically control a degree of throttle opening. The actuator includes an actuator 4 for a traction control device and an actuator 5 for an automatic drive device. The throttle valve 3 is urged by a spring (not shown) so as to close the inlet air passage 2 and connected to the actuator 4 and 5 through cables 6 and 7, respectively, in such a manner that an opening of the throttle valve 3 corresponds to an amount of operation of the actuator 4 or 5, whichever larger in an amount of the opening of the throttle valve 3.

The vehicle body is mounted, respectively, with left-hand and right-hand undriven front wheels 11 and 12 and with left-hand and right-hand driven rear wheels 13 and 14 which in turn are connected to an output shaft of the engine 1 through a power transmission mechanism such as a transmission 10 or the like. The wheels 11 through 14 are mounted with respective wheel speed sensors 15 through 18 and further with calipers 21 through 24 of brakes (torque adjusting means), which are driven hydraulically upon application of pressures by pressing a brake pedal (not shown). The left-hand and right-hand calipers 23 and 24 for the respective driven rear wheels 13 and 14 are drivable by a brake actuator 25 in response to a brake control signal. More specifically, when the brake actuator 25 is operated, a braking pressure is transmitted from an electrical pump 26 functioning as a source of pressure to be applied to the calipers 23 and 24 through passages 27 and 28, respectively. The brake actuator 25 is in a structure to individually adjust the braking pressures against the left-hand and right-hand calipers 23 and 24 for the driven rear wheels 13 and 14, respectively.

The slippage preventing apparatus according to the present invention contains a traction control unit ECU 31 consituting the traction control device as a first control means and an automatic speed control unit ECU 32 consituting the automatic drive device as a second control means.

The traction control unit ECU 31 is designed to provide feedback control to the throttle valve 3 by the actuator 4 so as to decrease an engine output during slippage of the driven wheels by giving a control signal output to the actuator 4 in response to signals from the wheel speed sensors 15 through 18 mounted on the respective wheels 11 through 14 and to a signal from an accelerator sensor 33 for detecting an accelerator opening, viz., an amount of operation of the accelerator. In this embodiment, the brake is also controlled during slippage of the driven wheels by a brake control signal output from a braking source adjusting means to the brake actuator 25 from the traction control unit ECU 31.

The automatic speed control unit ECU 32 for the automatic drive device is also disposed to allow the actuator 5 to control the throttle valve 3 by controlling an engine output so as to maintain a predetermined vehicle speed according to operation of command switches 34, 35 and 36 by outputting a control signal to the actuator 5 in response to signals from the command switches 34, 35 and 36 to be operated for predetermining a vehicle speed by the driver, a signal from a vehicle speed sensor 37 mounted in the transmission 10, a signal from a brake switch 38 for detecting the pressing of the brake pedal and a signal from a main switch 39. The command switches includes a set switch 34 capable of setting acceleration and a vehicle speed, a coast switch 35 capable of setting deceleration and a vehicle speed, and a resume switch 36 for resuming a vehicle speed to the previous constant speed.

The automatic speed control unit ECU 31 is provided with a slippage detecting means 50 for detecting a degree of slippage of the driven wheels and outputting a signal so as to operate the traction control device. The automatic speed control unit ECU 32 is provided with an automatic drive device suspending means 58 (restricting means) for suspending operation of the automatic drive device so as to allow the traction control device to be operable prior to the automatic drive device even in such a state that the latter is capable of being operable.

Figure 2:
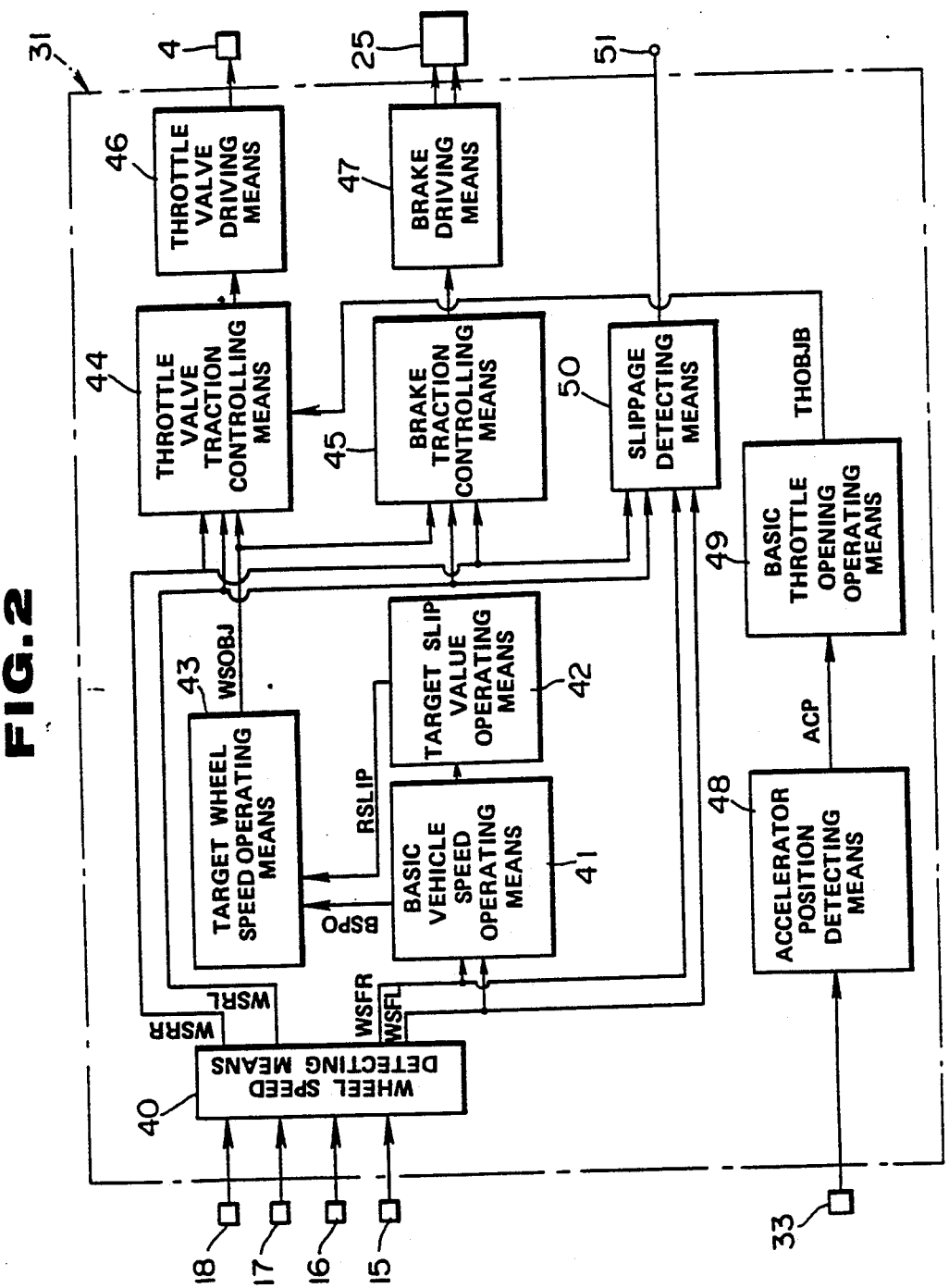
FIG. 2 is a functional block view illustrating an inner structure of the traction control unit ECU.

FIG. 2 shows an interior structure of the traction control unit ECU 31. This control unit 31 contains a wheel speed detecting means 40 for detecting wheel speeds in response to outputs from the respective wheel speed sensors 15 through 18, a basic wheel speed operating means 41 for operating a basic wheel speed BSPD on the basis of wheel speeds WSFR and WSFL of the respective undriven wheels 11 and 12, a target slip ratio operating means 42 for operating a target slip ratio RSLIP, a target wheel speed operating means 43 for operating a target wheel speed WSOBJ based on the basic wheel speed BSPD and the target slip value RSLIP, a throttle valve traction controlling means 44 for determining a degree of throttle opening in accordance with a degree of slippage of the driven wheels by comparing the target wheel speed WSOBJ with driven wheel speeds WSRR and WSRL of the respective driven wheels 13 and 14, a brake traction controlling means 45 for determining an amount of controlling the brake in accordance with a degree of slippage thereof by comparing the target wheel speed WSOBJ with the driven wheel speeds WSRR and WSRL thereof, a throttle valve driving means 46 for outputting a control signal to the actuator 4 of the throttle valve 3 to open the throttle valve 3, and a brake driving means 47 for outputting a control signal to the brake actuator 25 to drive the brake. The traction control unit ECU 31 is further provided with an accelerator position detecting means 48 for receiving an output from the accelerator sensor 33 and a basic throttle opening operating controlling means 49 for operating a degree of a basic throttle opening THOBJB in accordance with an accelerator position ACP detected by the accelerator position detecting means 48. The throttle valve traction controlling means 44 is designed to provide, as a final control amount, whichever smaller the basic throttle opening THOBJB or a throttle opening based on the target wheel speed WSOBJ and a mean value or average between the wheel speeds WSRR and WSRL of the respective driven wheels 13 and 14, so as to substantially implement a traction control in a predetermined degree of slippage of the driven wheels 13 and 14. The traction control unit ECU 31 further contains the slippage detecting means 50 for detecting a degree of slippage of the driven rear wheels 13 and 14 and outputting a slip signal 51 so as to substantially implement the traction control based on a comparison of the wheel speeds of the driven wheels 13 and 14 with those of the undriven wheels 11 and 12.

Figure 3:
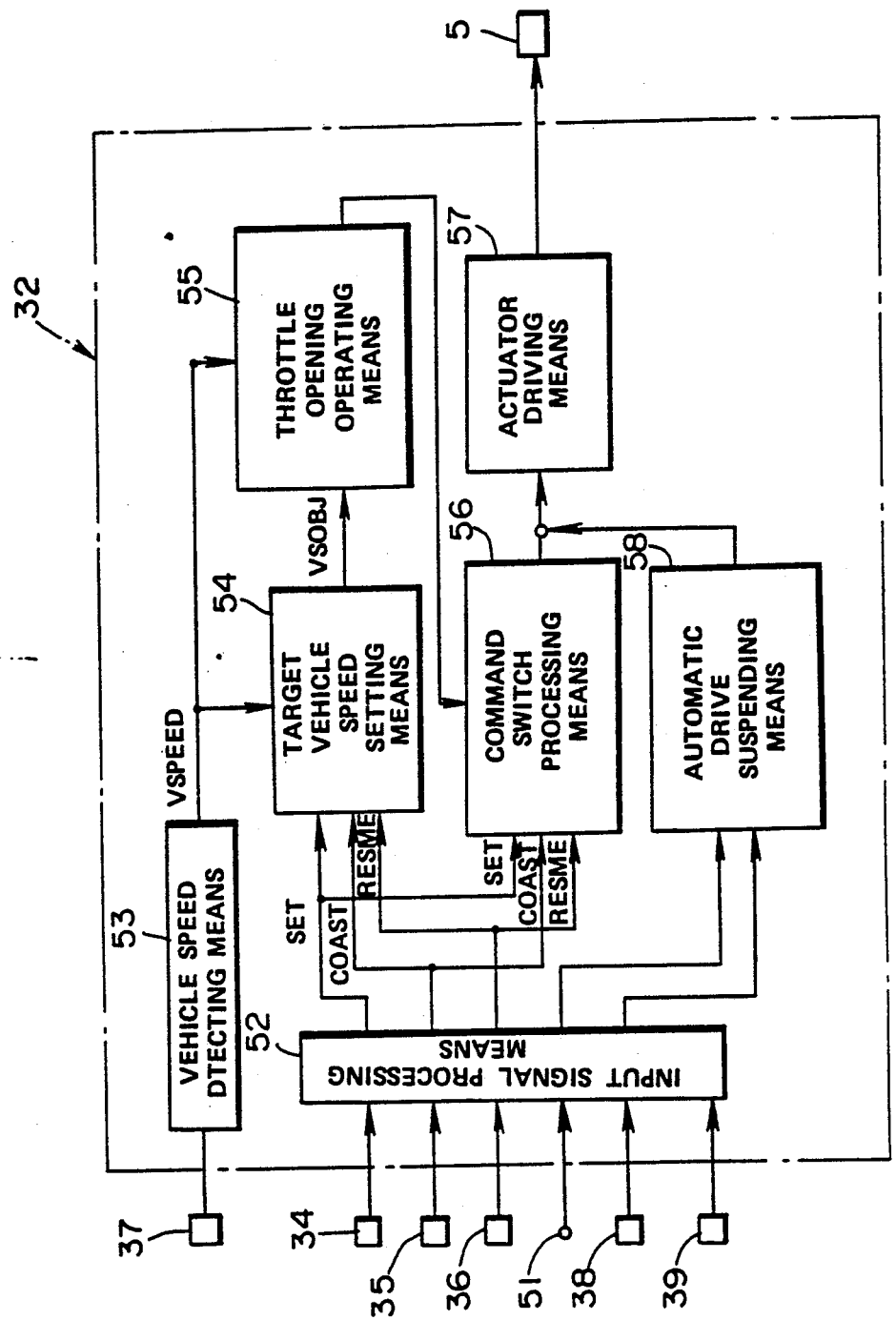
FIG. 3 is a functional block view illustrating an inner structure of the automatic drive control unit ECU.

FIG. 3 shows an interior structure of the automatic speed control unit ECU 32. This control unit ECU 32 contains a target constant vehicle speed setting means 54 for setting a target constant vehicle speed VSOBJ for automatic driving on the basis of signals from the command switches 34, 35 and 36 to be input through an input signal processing means 52 and on the basis of a vehicle speed VSPEED detected by a vehicle speed detecting means 53, a throttle opening operating means 55 for operating a degree of throttle opening based on the target constant vehicle speed VSOBJ and the vehicle speed VSPEED, a command switch processing means 56 for processing alteration of a degree of throttle opening or the like in accordance with the command switches 34, 35 and 36, and an actuator driving means 57 for feeding a control signal to the actuator 5 of the throttle valve 3 and driving the actuator 5 thereof. The automatic speed control unit ECU 32 is further provided with the automatic drive suspending means 58 which suspends the control of the automatic drive device and at the same time operates the traction control apparatus in response to the slip signal 51 from the slippage detecting means 50 in the traction control unit ECU 31. This automatic drive suspending means 58 is further designed to suspend the automatical driving in a particular condition such as where the brake pedal is stepped down or the like.

Figure 4:
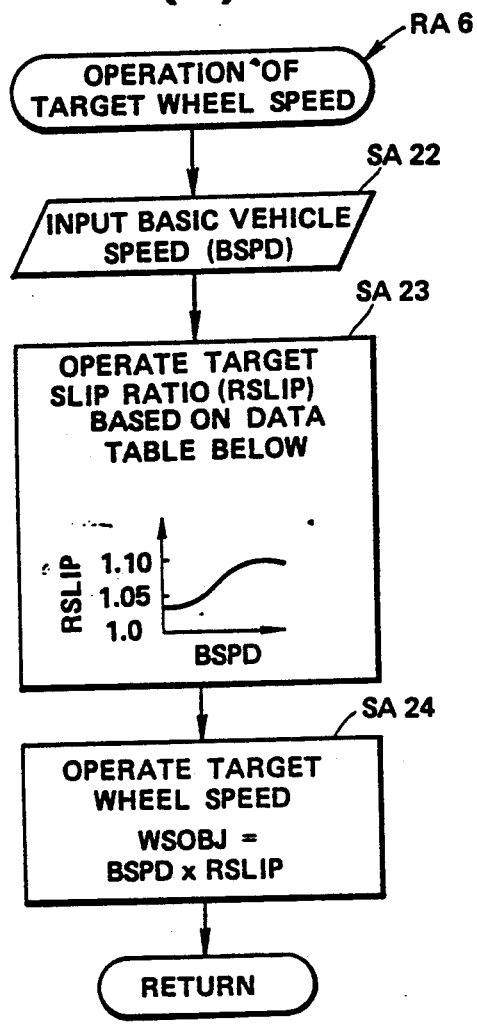
FIGS. 4(a) through 4(j) are flow charts illustrating a control by the traction control unit ECU.
Figure 4:
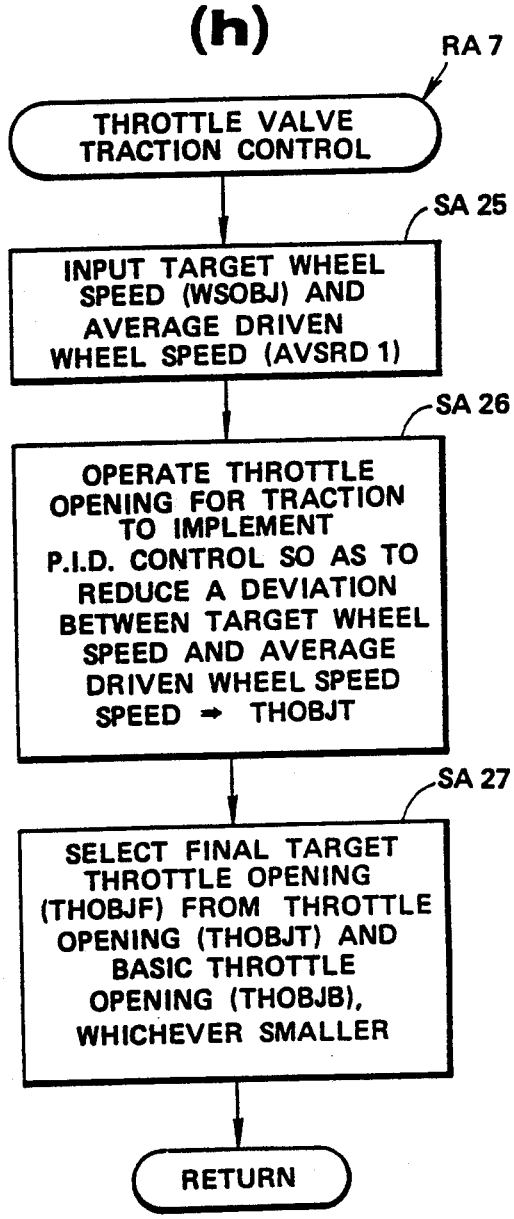
Figure 4:
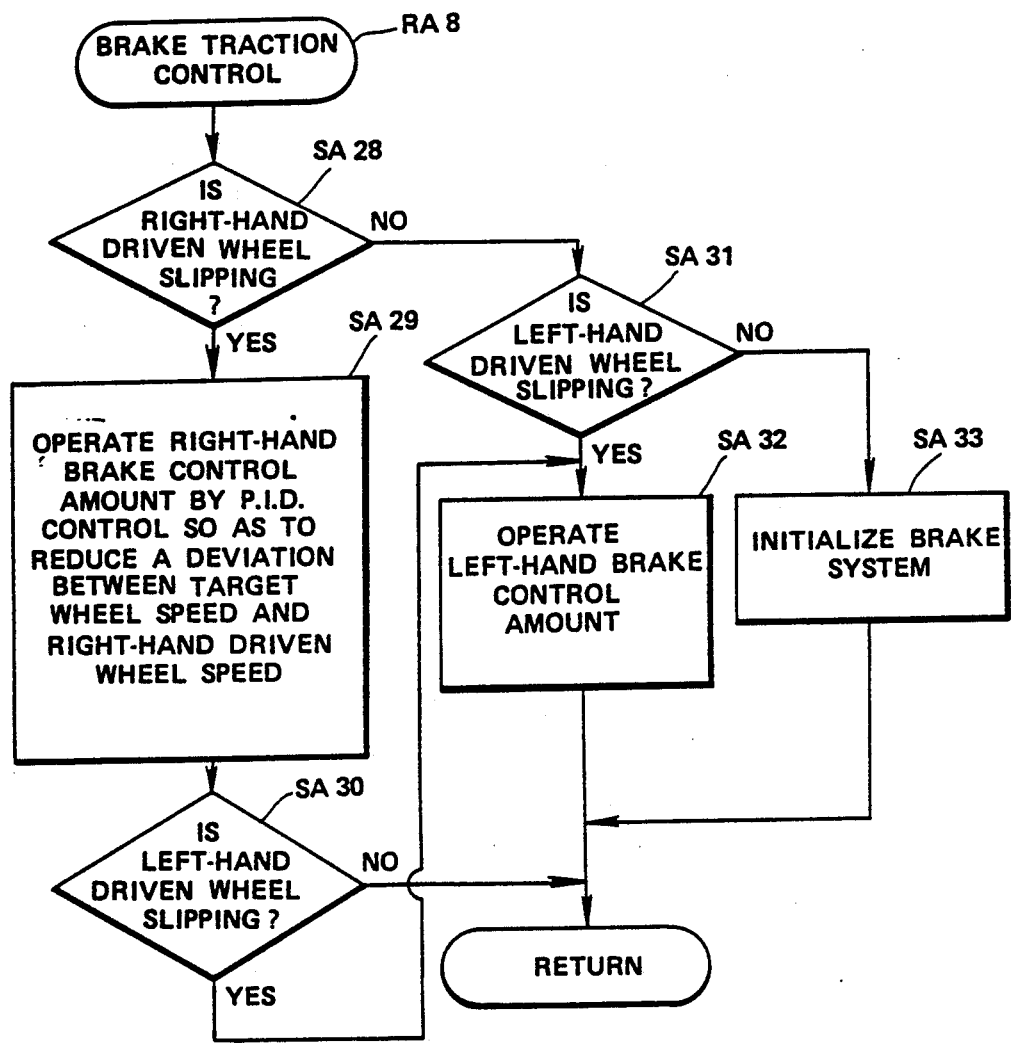
Figure 4:
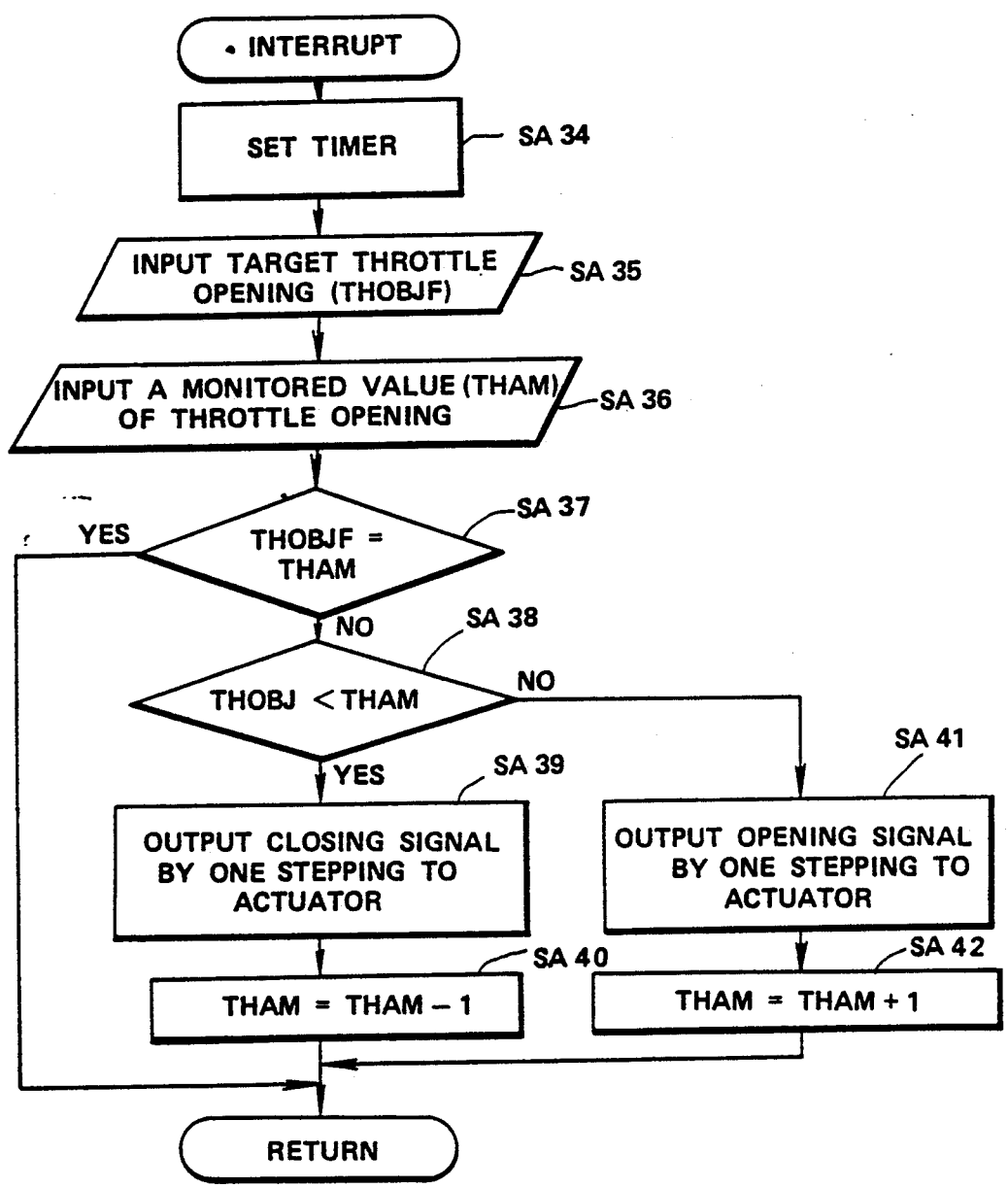

FIGS. 4(a) through 4(j) show flowcharts illustrating an embodiment of control by means of the traction control unit ECU 31. FIG. 4(a) demonstrates a main routine, FIG. 4(b) through (i) demonstrates subroutines contained in the main routine, and FIG. 4(j) demonstrates and interrupt routine.

In the main routine shown in FIG. 4a), the subroutine RA1 for initialization is first executed after the start of the main routine. A subroutine RA2 for various A/D conversions is then executed and then followed in the order by a subroutine RA3 for calculating a basic throttle opening, a subroutine RA4 for operating a wheel speed, a subroutine RA5 for detecting a degree of slippage and providing an output, a subroutine RA6 for operating a target wheel speed, a subroutine RA7 for a throttle valve traction control, a subroutine RA8 for a brake traction control. The processing of these subroutines is repeated in this order.

As shown in FIG. 4(a), the subroutine RA1 for initialization is executed by setting an input and an output of each port at step SA1, setting an initial value of each register at step SA2, and setting a timer for interrupting to process the interrupt routine at step SA3, as will be described hereinbelow.

Referring to FIG. 4(c), the subroutine RA2 for the A/D conversions is shown to be executed by setting a channel CH as zero at step SA4, subjecting an input value of a CH port to an A/D conversion at step SA5, altering the channel CH one by one at step SA6, storing an accelerator's position ACP (CH=1) at step SA7, which is an A/D converted value of an output from the accelerator sensor, or a preliminary value EXA (CH=2), and repeating the above steps at step SA8 until the channel CH becomes 2.

FIG. 4(d) shows the subroutine for calculating the basic throttle opening, which comprises step SA9 for reading in the accelerator position ACP and step SA10 for calculating the basic throttle opening THOBJB in accordance with the accelerator position ACP from a map that sets characteristics of the basic throttle opening THOBJB with respect to the accelerator position ACP as shown in the drawing.

As shown in FIG. 4(e), the subroutine RA4 for operating the wheel speed comprises step SA11 in which a cycle of a signal from each of the wheel speed sensors 15 to 18, inclusive, is measured, step SA12 in which wheel speeds WSFL, WSFR, WSRL and WSRR of the left-hand and right-hand undriven front wheels 11 and 12 and the left-hand and right-hand driven rear wheels 13 and 14, respectively, are operated by multiplying reciprocal numbers of the cycles by a predetermined conversion factor K, and step SA13 in which the basic vehicle speed BSPD is operated from average values of, for example, the left-hand and right-hand undriven front wheels 11 and 12 on the basis of the wheel speeds WSFL and WSFR thereof, respectively.

FIG. 4(f) shows the subroutine RA5 for detecting a degree of slippage and outputting a signal. In this subroutine, the wheel speeds WSRL and WSRR of the respective left-hand and right-hand driven rear wheels 13 and 14 are input at step SA14 and an average AVSPDI between the wheel speeds WSRL and WSRR thereof is given at step SA15. Then at step SA16, the wheel speeds WSFL and WSFR of the respective left-hand and right-hand undriven front wheels 11 and 12 are input and, at step SA17, an average AVSPD2 between the wheel speeds WSFL and WSFR thereof is given. An step SA18, a difference ΔSPD between the average values AVSPDI and AVSPD2 is given and, in step SA19-1, a slip ratio S(%) is given by dividing the difference ΔSPD by the average value AVSPD2 and multiplying the division by 100. In step SA19-2, it is judged whether or not the slip ratio S is equal to or larger than 4%. If it is judged as YES at step SA19-2, the slip signal 51 is output as "High" in step SA20. If NO at step SA19-2, the slip signal 51 is output as "Low" in step SA21.

As shown in FIG. 4(g), the subroutine RA6 is for operating the target wheel speed, which comprises step SA22 for inputting the basic vehicle speed BSPD, step SA23 for giving the target slip ratio RSLIP based on the basis vehicle speed BSPD, for example, so as to become a predetermined relationship as shown in the drawing in conjunction with a data table. The target slip ratio RSLIP is usually approximately 4% at low speeds and approximately 10% at high speeds. In step SA24, the target wheel speed WSOBJ is given by multiplying the basic vehicle speed BSPD by the target slip ratio RSLIP.

Turning to FIG. 4(h), the subroutine RA7 for the throttle valve traction control is executed by step SA25 in which the target wheel speed WSOBJ and the average value AVSPD1 of the driven wheel speeds WSRL and WSRR for the respective driven wheels 13 and 14 are input, step SA26 in which the throttle opening THOBJT for traction is operated by implementing the P.I.D. control so as to make a deviation between the target wheel speed WSOBJ and the average value AVSPD1 smaller, and step SA27 in which a final target throttle opening THOBJF is selected from the throttle opening THOBJT or the basic throttle opening THOBJB, whichever smaller.

FIG. 4(i) shows the subroutine RA8 for the brake traction control. In step SA28, it is discriminated whether or not, for example, the right-hand driven wheel is being slipped by investigating whether a difference between the wheel speed WSRR of the right-hand driven wheel 14 and the basic vehicle speed is larger than a predetermined value. If YES in step SA28, an amount of controlling the right-hand brake is given in step SA29 by implementing the P.I.D. control so as to make a deviation between the target wheel speed WSOBJ and the wheel speed WSRR of the right-hand driven wheel 14 smaller. After the step SA29 and if it is judged NO at the step SA29, it is then judged at step SA30 whether or not the left-hand driven wheel 13 is being slipped in substantially the same manner as the right-hand driven wheel 14. If YES in the step SA30 or SA31, an amount of controlling the left-hand brake is given in step SA32 like the right-hand brake as have been described hereinabove. In instances where it is judged that neither the left-hand and right-had driven wheels 13 and 14 are being slipped in the step SA31, the brake system is initialized in step SA33. If NO at the step SA30, the system is returned.

The interrupt routine shown in FIG. 4(j) is to operate the throttle valve 3 and is activated, for example, for every 1 ms. In step SA34, a timer is et for the next interruption. The target throttle opening THOBJF is input in step SA35 and a monitered value THAM obtained by monitoring an amount of operation of the throttle valve investigated as the number of driven steps of the actuator 4 in step SA36. In step SA37, it is discriminated whether or not the final target throttle opening THOBJF is equal to the monitored value THAM. If YES in the step SA37, the flow is returned. If NO in the step SA37, the flow proceeds to step SA38 where it is discriminated whether or not the final target throttle opening THOBJF is smaller than the monitored value THAM. If YES in the step SA38 or the final target throttle opening THOBJF is smaller than the monitored value THAM, a signal for closing by one stepping is output to the actuator 4 in step SA39 and the monitored value THAM is decreased by one in step SA40. If NO in the step SA38 or the final target throttle opening THOBJF is larger than the monitored value THAM, a signal for opening by one stepping is output to the actuator 4 in step SA41 and the monitored value is increased by one in step SA42. In other words, the throttle valve 3 is driven in a direction toward the target throttle opening.

Figure 5:
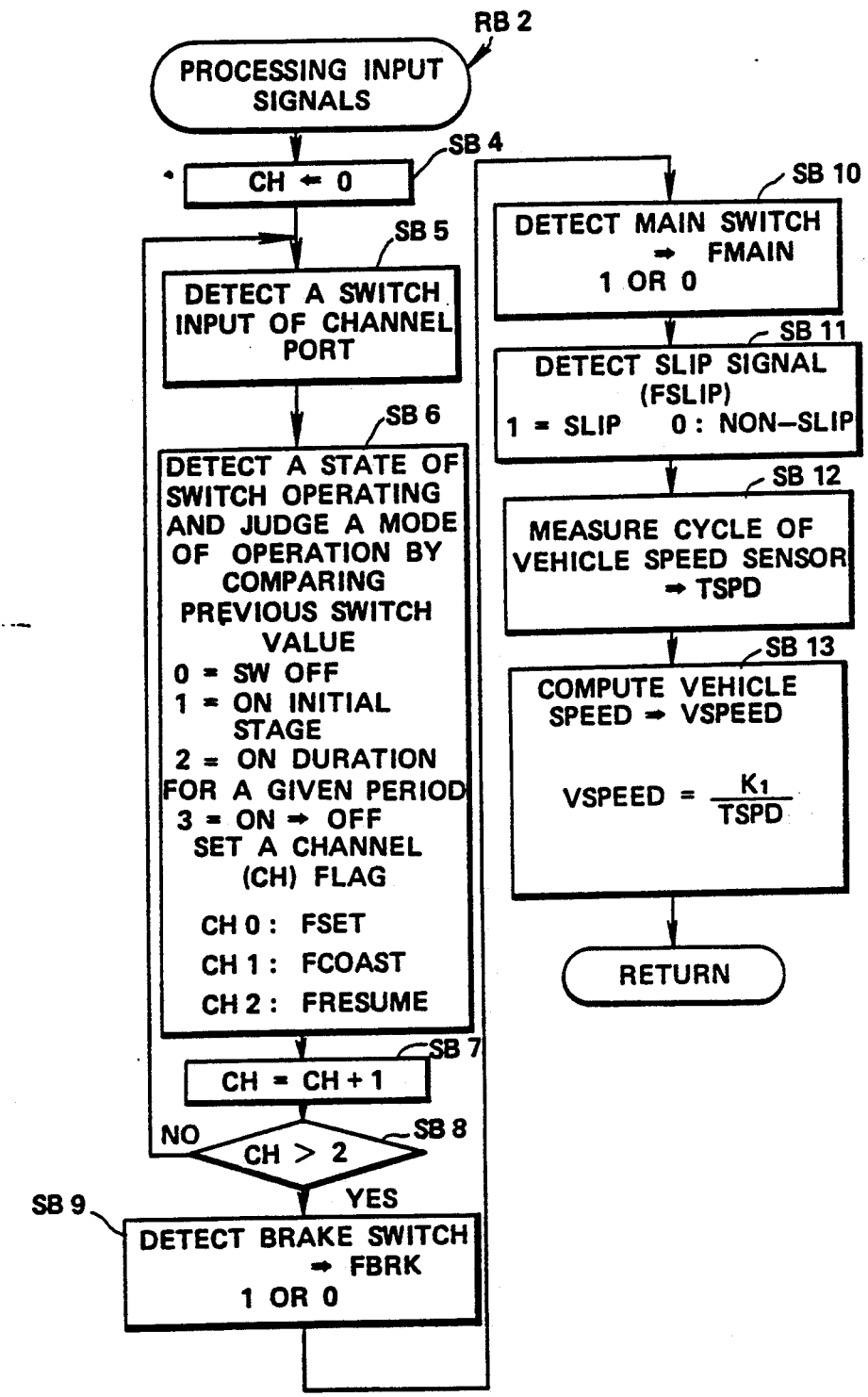
FIGS. 5(a) through 5(h) are flow charts illustrating a control by the automatic speed control unit ECU.

FIGS. 5(a) through 5(h) are flow charts showing one example of control by means of the automatic speed control unit ECU 32. FIG. 5(a) shows a main routine, and FIGS. 5(b) through 5(h) show subroutines contained in the main routine.

In the main routine as shown in FIG. 5(a), a subroutine RB1 for initialization is executed after the start of the main routine. After the subroutine RB1, a subroutine RB2 for processing input signals is conducted and followed in the order by a subroutine RB3 for setting a target vehicle speed, a subroutine RB4 for operating a degree of throttle opening, a subroutine RB5 for processing command switches, a subroutine RB6 for discriminating suspension of automatic driving, and a subroutine RB7 for driving the actuator. The processing of these subroutines in this order is effected in a repetitive manner.

As shown in FIG. 5(b), the subroutine RB1 for initialization comprises step SB1 for setting an input and an output for each port, step SB2 for setting an initial value for each register, and step SB3 for clearing various flags.

FIG. 5(c) shows the subroutine RB2 for processing the input signals which comprises step SB4 in which a channel CH is made zero, and step SB5 in which inputs from switches of the CH ports (signals from the command switches 34, 35 and 36) are detected. In step SB6 after the step SB5, a state of operation of each of the switches 34, 35 and 36 is investigaged and a mode for such a state is judged. A value demonstrating a result of judgement is set in a set switch flag FSET for the set switch 34 when the channel CH is zero, in a coat switch flag FCOAST for the coast switch 35 when the channel CH is 1, and in a resume switch flag FRESUME for the resume switch 36 when the channel CH is 2. Each of the switches 34, 35 and 36 is designed such that the flag is set to zero in instances where the switch is in a state of being turned off, the flag is set to one at the initial stage of the switch being turned on, the flag is set to two in instances where the switch is kept being turned on for a predetermined period of time (for example, 300 ms), and the flag is set to three at the time when the switch is resumed from the state of being turned on (a state of the flag being one or two) to a state of being turned off. In step SB7, the channel CH is increased by one. A series of the steps ranging from the step SB5 to the step SB7 is repetitively processed in step SB8 until the channel CH becomes larger than two.

Furthermore, in step SB9, a brake switch flag FBRK is set in response to a signal from the brake switch 38 to one when the brake switch is turned on and to zero when it is turned off. In step SB10, a main switch flag FMAIN is set in response to a signal from the main switch 39 to one when the main switch is turned on and to zero when it is turned off. In step SB11, a slip flag FSLIP is set in response to the slip signal 51 to one when the driven wheels are being slipped in the case of the slip signal 51 being "High" and to zero when they are not being slipped in the case of the slip signal 51 being "Low". In step SB12, a cycle TSPD of a signal from the vehicle speed sensor 37 is measured and, in step SB13, a vehicle speed VSPEED is calculated by multiplying a reciprocal number of the cycle TSPD by a predetermined conversion coefficient $K_1$.

As shown in FIG. 5(d), in the subroutine RB3 for setting the target vehicle speed it is investigated whether or not either one of the command switches 34, 35 and 36 is in a state of being returned from OFF to ON. At step SB14 it is judged whether or not the set switch flag FSET is 3, at step SB15 it is judged whether or not the coast switch flag FCOAST is 3, and at step SB16 it is judged whether or not the resume switch flag FRESUME is 1. If YES in step SB14 or SB15, the current vehicle speed VSPEED is input as "A" in step SB17 and the flow proceeds to step SB19. If YES in the step SB16, a memory value VSOBJL of the target vehicle speed VSOBJ set previously is input as "A" in step SB18 and the flow proceeds to the step SB19. In the step SB19, the value "A" is made the target vehicle speed VSOBJ for controlling the automatic driving and the value "A" is further made the memory value VSOBJL for the resume operation which follows. If all of the steps SB14, SB15 and SB16 are judged as NO, the flows are returned.

In the subroutine RB4 for operation of the throttle opening, as shown in FIG. 5(e), the current vehicle speed VSPEED is input at step SB20 and the target vehicle speed VSOBJ is input at step SB21. A target throttle opening THOBJA is calculated at step SB22 by implementing the P.I.D. control so as to make a deviation between the current vehicle speed VSPEED and the target vehicle speed VSOBJ smaller.

As shown in FIG. 5(f), the subroutine RB5 for processing the command switches comprises step SB23 in which it is judged whether or not the set switch flag FSET is 2 or the set switch 34 is kept being pressed. If NO at step SB23, it is then judged at step SB24 whether or not the coast switch flag FCOAST is 2 or the coast switch 35 is kept on being pressed. If YES at step SB23, a given value KACC is added to the target throttle opening THOBJA at step SB25 and the flow is then returned. If it is judged YES at step SB24, a given value KDEC is deducted from the target throttle opening THOBJA at step SB26. If NO at step SB24, the flow is then returned.

FIG. 5(g) shows the subroutine RB6 for judging suspension of the automatic driving. In step SB27, it is judged whether or not the brake switch flag FBRK is one. If NO at step SB27, it is then judged at SB28 whether or not the main switch flag FMAIN is one. If NO at step SB28, it is further judged at step SB29 whether or not the slip flag FSLIP is one. If YES in the step SB29 or the slip signal 51 is "High", the substantial control of the automatic driving is suspended in step SB30 by making the target throttle opening THOBJA zero and then cancelling the target vehicle speed VSOBJ. If YES in the step SB27 or SB28, the flow proceeds to the step SB30 where the automatic driving is likewise suspended. If NO in the step SB29, the flow is returned.

In the subroutine RB7 for driving the actuator 5 as shown in FIG. 5(h), the target throttle opening THOBJA is input in step SB31 and the monitored value THAM for determining an amount of operation of the throttle valve investigated by the number of driving steps of the actuator 5 is input in step SB32. Then, in step SB33, it is judged whether or not the target throttle opening THOBJA is equal to the monitored value THAM. If YES at the step SB33, on the one hand, the flow is returned, and if NO at the step SB33, on the other, it is then judged at step SB34 whether or not the target throttle opening THOBJA is larger than the monitored value THAM. If YES in the step SB34, a signal for opening by one stepping is output to the actuator 5 at step SB35 and the monitored value THAM is increased by adding one thereto at step SB36. If NO in the step SB34, a signal for closing by one stepping is output to the actuator 5 at step SB37 and the monitored value THAM is deducted by one in step SB38.

The control according to the flow charts as shown in the above drawings permits the traction control unit ECU 31 constituting the traction control device to give the throttle opening THOBJ for traction control in accordance with the target wheel speeds set on the basis of the undriven wheels and the wheel speeds of the driven wheels and to set the throttle opening THOBJ as a target throttle opening when the throttle opening THOBJ is smaller than the basic throttle opening THOBJB, thus permitting a control over the actuator 4 for traction control device and thus allowing the traction control to be implemented so as to reduce an engine output during slippage of the driven wheels. For the automatic drive suspension device constituted by the automatic speed control unit ECU 32, the actuator 5 for the automatic drive suspension device is controlled in such a manner that the engine output is controlled so as to maintain the vehicle speed set at the time when command switches 34, 35 and 36 are returned from ON to OFF in response to the signals from the command switches 34, 35 and 36.

In this case, the throttle valve 3 is operated to amount to its degree of opening so as to correspond to an amount of operation of the actuator 4 or 5, whichever larger in a degree of opening. Accordingly, if the automatic speed control unit ECU 32 is kept on being operated in order to maintain the automatic driving when the traction control is turned into a stage in which the engine output is reduced during occurrence of slippage, the traction control does not work and slippage is not reduced. Thus, in this case, the subroutine RB6 as shown in FIG. 5(g) is processed in response to the slip signal 51 and the automatic drive control is suspended, thus permitting the traction control to be implemented prior to suspension of the automatic driving and controlling slippage of the driven wheels.

In the embodiments as have been described hereinabove the engine outputs by the traction control device and by the automatic drive device are controlled by the throttle valve 3. It is further to be understood that the engine output may be controlled by an amount of fuel to be fed or a timing of ignition.

Figure 6:
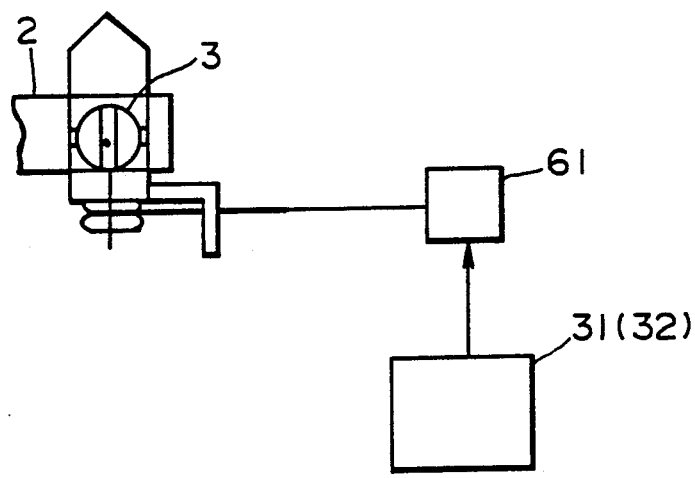
FIG. 6 is a diagrammatical view illustrating an essential portion of another example of the slippage preventing apparatus according to the present invention.
Figure 7:
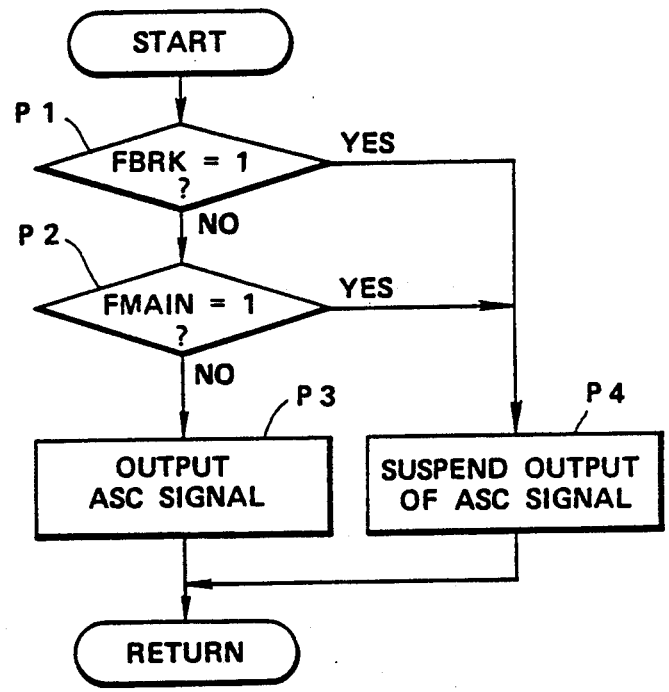
FIGS. 7 and 8 are flowcharts illustrating a control manner of the another example.
Figure 8:
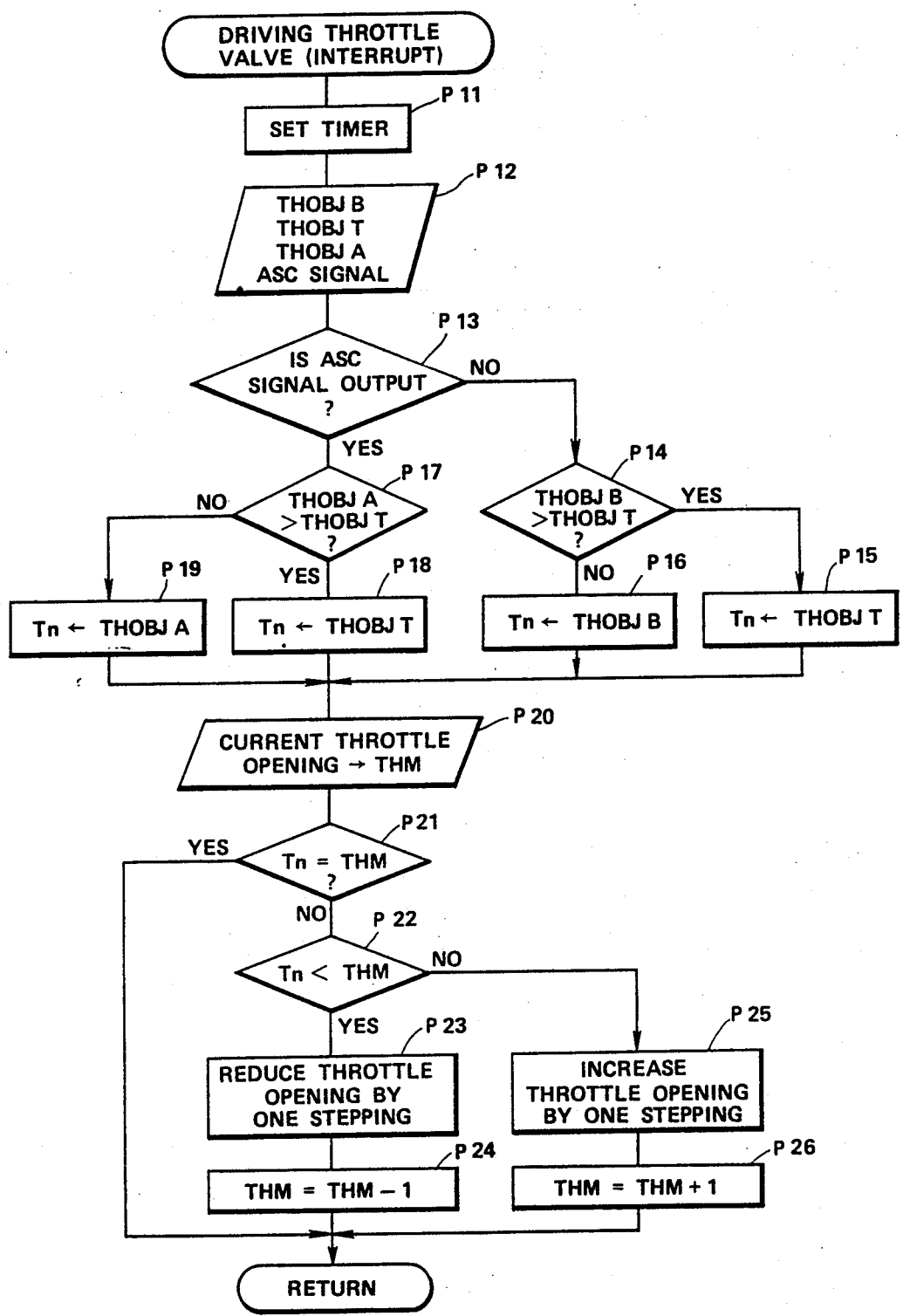

Turning now to FIGS. 6 through 8, there is shown another example embodying the slippage preventing apparatus according to the present invention.

This embodiment is directed to an example in which the throttle valve 3 is driven by one actuator 61 that is designed to control a degree of opening of the throttle valve 3 during automatic driving so as not to become larger than the target throttle opening by means of the slip control.

As shown in FIGS. 7 and 8, it is to be understood in this embodiment that step RA5 of FIG. 4(a) is removed leading to absence of both FIGS. 4(f) and 4(j) and step SA27 in FIG. 4(h) is absent. Furthermore, step RB7 in FIG. 5(a) is so absent that FIG. 5(h) is no longer necessary and FIG. 5(g) is modified to FIG. 7.

Modifications will be described more in detail in conjunction with FIG. 7. As shown in FIG. 7, steps P1 and P2 are the same as step SB27 and SB28 of FIG. 5(g), respectively. If it is judged NO at both steps P1 and P2, on the one hand, the flow advances to step P3 where an output of an ASC signal is output in order to indicate that the automatic drive control (ASC control) is required at the current time. If it is judged YES at steps P1 or P2, on the other hand, the flow proceeds to step P4 and the ASC signal is suspended in order to indicate that no automatic drive control is required.

FIG. 8 is to make an interruption for every given period of time. At step P11, a timer is set to determined a timing for interruption. At step P12, there are read in the basic throttle opening THOBJB (as referred to in step SA10 of FIG. 4(d)), the target throttle opening THOBJT (as referred to in step SA26 of FIG. 4(h)), the target throttle opening THOBJA for automatic drive control (as referred to in step SB19 of FIG. 5(d)), and the ASC signal (as referred to in steps P3 and P4 of FIG. 7). At step P13, it is judged whether or not the ASC signal is output. If NO at step P13, on the one hand, it is judged that no automatic drive control is required so that the flow proceeds to step P14 where it is then judged whether or not the basic throttle opening THOBJB is larger than the target throttle opening THOBJT for the slip control. If YES at step P14, on the one hand, the target throttle opening THOBJT is set as a final target throttle opening Tn at step P15. If NO at step P14, on the other, the basic throttle opening THOBJB is set as a final target throttle opening TN at step P16.

If YES at step P13, on the other hand, it is judged that there is required the automatic drive control so that the flow advances to step P17 where it is then judged whether or not the target throttle opening THOBJA for the automatic drive control is larger than the target throttle opening THOBJT for the slip control. If it is judged YES at step P17, the target throttle opening THOBJT is set as a final target throttle opening Tn at step P18. If NO at step P17, the target throttle opening THOBJA is set as a final target throttle opening Tn at step P19.

After step P15, P16, P18 or P19, a current throttle opening THM is read in at step P20. Then it is judged at step P21 whether or not the final target throttle opening Tn is equal to the current throttle opening THM. If YES at step P21, the system is returned as it is. If NO at step P21, it is then judged at step P22 whether or not the final target throttle opening Tn is smaller than the current throttle opening THM. If YES at step P22, on the one hand, the throttle opening is reduced by one stepping at step P23 and the current throttle opening THM is processed to be reduced by one step at step P24. If NO at step P22, on the other hand, the throttle opening is increased by one stepping at step P25 and the current throttle opening THM is processed to be increased by one step at step P26 and the system is then returned.

It is to be understood that the foregoing text and drawings relate to embodiments of the present invention given by way of examples but not limitation. Various other embodiments and modifications are possible within the spirit and scope of the present invention.

What is claimed is:

1. A slippage preventing apparatus for a vehicle comprising:
   output adjusting means for adjusting an output of an engine by increasing or decreasing the output thereof;
   slippage detecting means for detecting a degree of slippage on pavement of a driven wheel thereof driven by the engine;
   first control means for controlling said output adjusting means to reduce the output of the engine during occurrence of slippage in response to an output from said slippage detecting means;
   second control means for controlling said output adjusting means to cause a vehicle speed to reach a given vehicle speed, said second control means being manually actuatable; and
   restricting means for restricting operation of said second control means at least during operation of said first control means.

2. A slippage preventing apparatus as claimed in claim 1, wherein said output adjusting means comprises a throttle valve adapted to adjust an amount of intake air into said engine; and said first and second control means are adapted each to control operation of said throttle valve.

3. A slippage preventing apparatus as claimed in claim 2, wherein said first control means establishes a feedback of said throttle valve so as to cause a wheel rotation speed of the driven wheel to reach a given target rotation speed.

4. A slippage preventing apparatus as claimed in claim 2, further comprising braking force adjusting means for adjusting a braking force against the driven wheel, said first control means controlling said braking force adjusting means in addition to said output adjusting means.

5. A slippage preventing apparatus as claimed in claim 2, further comprising accelerator opening detecting means for detecting a degree of accelerator opening; and
   basic throttle controlling means for controlling operation of said throttle valve in accordance with the accelerator opening detected by said accelerator opening detecting means;
   said first and second control means each controlling operation of said throttle valve prior to said basic throttle controlling means.

6. A slippage preventing apparatus as claimed in claim 2, further comprising vehicle speed detecting means for detecting a vehicle speed;
   said second control means establishing a feedback of operation of said throttle valve so as to cause the vehicle speed detected by said vehicle speed detecting means to reach a given vehicle speed.

7. A slippage preventing apparatus as claimed in claim 2, wherein one actuator is disposed for driving said throttle valve;
   said first control means controls said actuator so as to allow said throttle valve to reach a first target throttle opening;
   said second control means controls said actuator so as to allow said throttle valve to reach a second target throttle opening; and
   said restricting means drives said throttle valve so as to set said first target throttle opening prior to said second target throttle opening when said first target throttle opening is smaller than said second target throttle opening.

8. A slippage preventing apparatus as claimed in claim 2, wherein a first actuator and a second actuator are provided, said first and second actuators being adapted each to drive said throttle valve and designed so as to allow the one actuator to be driven prior to the other, the one actuator driving a throttle valve to amount to a degree of throttle opening wider than the other when said first and second actuators are operated at the same time to drive said throttle valve;
   said first control means controls said first actuator;
   said second control means controls said second actuator; and
   said restricting means control said second actuator so as to cause the throttle opening of said throttle valve to reach zero.

9. A slippage preventing apparatus for a vehicle comprising:
   output adjusting means for adjusting an output of an engine by increasing or decreasing the output thereof;
   torque adjusting means for adjusting a torque to be applied to a driven wheel driven by said engine;
   slippage detecting means for detecting a degree of slippage on pavement of the driven wheel larger than a given value;
   first control means for controlling said torque adjusting means so as to reduce the torque to be applied to the driven wheel when the degree of slippage is larger than the given value, in response to an output from said slippage detecting means;
   second control means for controlling said output adjusting means so as to allow a vehicle speed to reach a given vehicle speed, said second control means being manually actuatable; and
   restricting means for restricting a control over an increase in the output of the engine from said second control means when said first control means is operated during operation of said second control means.

10. A slippage preventing apparatus as claimed in claim 9, wherein said torque adjusting means is a brake for applying a braking force to the driven wheel.

11. A slippage preventing apparatus as claimed in claim 10, wherein said first control means controls said brake so as to reduce a degree of slippage of the driven wheel.

12. A slippage preventing apparatus as claimed in claim 11, wherein said first control means establishes a feedback of said brake so as to allow a degree of slippage of the driven wheels to reach a given value.

13. A slippage preventing apparatus as claimed in claim 10, wherein said torque adjusting means comprises said brake as a first torque adjusting means and a second torque adjusting means for increasing or decreasing the output of the engine; and said first control means controls said first and second torque adjusting means when a degree of slippage of the driven wheel exceeds a given value.

14. A slippage preventing apparatus as claimed in claim 9, wherein said torque adjusting means is set to increase or decrease the output of the engine.

15. A slippage preventing apparatus as claimed in claim 14, wherein said output adjusting means further comprises said torque adjusting means.

16. A slippage preventing apparatus as claimed in claim 15, wherein said restricting means is set to control said output adjusting means by means of said first control means prior to said output adjusting means by means of said second control means.

17. A slippage preventing apparatus as claimed in claim 15, wherein said restricting means is set to restrict operation of said second control means.

18. A slippage preventing apparatus as claimed in claim 15, wherein said output adjusting means is a throttle valve for adjusting an amount of intake air into the engine.

19. A slippage preventing apparatus as claimed in claim 14, wherein said first control means controls said torque adjusting means so as to reduce a degree of slippage of the driven wheel.

20. A slippage preventing apparatus as claimed in claim 19, wherein said first control means establishes a feedback of said torque adjusting means so as to allow a degree of slippage of the driven wheel to reach a given value.

21. A slippage preventing apparatus as claimed in claim 9, wherein said slippage detecting means is set to detect a degree of slippage of the driven wheel on the basis of rotation speeds o the driven wheels and rotation speeds of the undriven wheels.

22. A slippage preventing apparatus as claimed in claim 21, wherein said restricting means is set to restrict an increase in the output of the engine by means of said second control means when a degree of slippage of the driven wheel exceeds a given value.

* * * * *